United States Patent
Bantz et al.

(10) Patent No.: US 7,318,031 B2
(45) Date of Patent: Jan. 8, 2008

(54) APPARATUS, SYSTEM AND METHOD FOR PROVIDING SPEECH RECOGNITION ASSIST IN CALL HANDOVER

(75) Inventors: David Frederick Bantz, Chappaqua, NY (US); Dennis Gerard Shea, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 1112 days.

(21) Appl. No.: 09/852,110

(22) Filed: May 9, 2001

(65) Prior Publication Data

US 2002/0169606 A1    Nov. 14, 2002

(51) Int. Cl.
*G10L 15/04*    (2006.01)
(52) U.S. Cl. .................. 704/251; 704/270; 704/235
(58) Field of Classification Search ................ 704/251, 704/257, 235; 379/88.01
See application file for complete search history.

(56) References Cited

U.S. PATENT DOCUMENTS

| | | | |
|---|---|---|---|
| 5,351,288 A * | 9/1994 | Engelke et al. .......... 379/93.09 |
| 5,724,410 A * | 3/1998 | Parvulescu et al. ...... 379/88.18 |
| 5,745,550 A * | 4/1998 | Eisdorfer et al. .......... 379/52 |
| 6,370,508 B2 * | 4/2002 | Beck et al. ................ 705/1 |
| 6,377,925 B1 * | 4/2002 | Greene et al. ........... 704/271 |
| 6,584,180 B2 * | 6/2003 | Nemoto .................. 379/88.01 |
| 6,594,346 B2 * | 7/2003 | Engelke ..................... 379/52 |
| 2002/0128821 A1 * | 9/2002 | Ehsani et al. ............. 704/10 |

\* cited by examiner

*Primary Examiner*—Abul K. Azad
(74) *Attorney, Agent, or Firm*—Duke W. Yee; Lisa M. Yamonaco; Peter B. Manzo

(57) ABSTRACT

An apparatus, system and method for providing speech recognition assist in call handover are provided. With the apparatus, system and method, spoken utterances of the call taker, not the caller, are captured using speech recognition technology and transcribed. The call taker can use a noise-canceling microphone placed optimally to receive voice input from the call taker. The speech recognition system can be trained to the specific speech patterns of the call taker and the vocabulary of the speech recognition system can be limited to the specific domain of discourse related to the job scope of the call taker. The transcription of the spoken utterances of the call taker may be stored in a record associated with the call. This record, and the corresponding transcription, may be transferred to another call taker upon handover of the call to the other call taker.

32 Claims, 3 Drawing Sheets

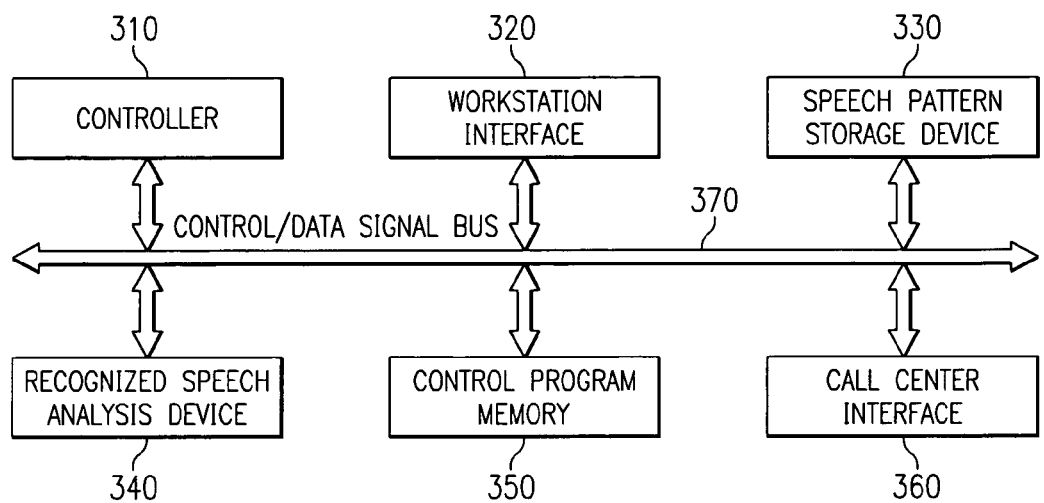
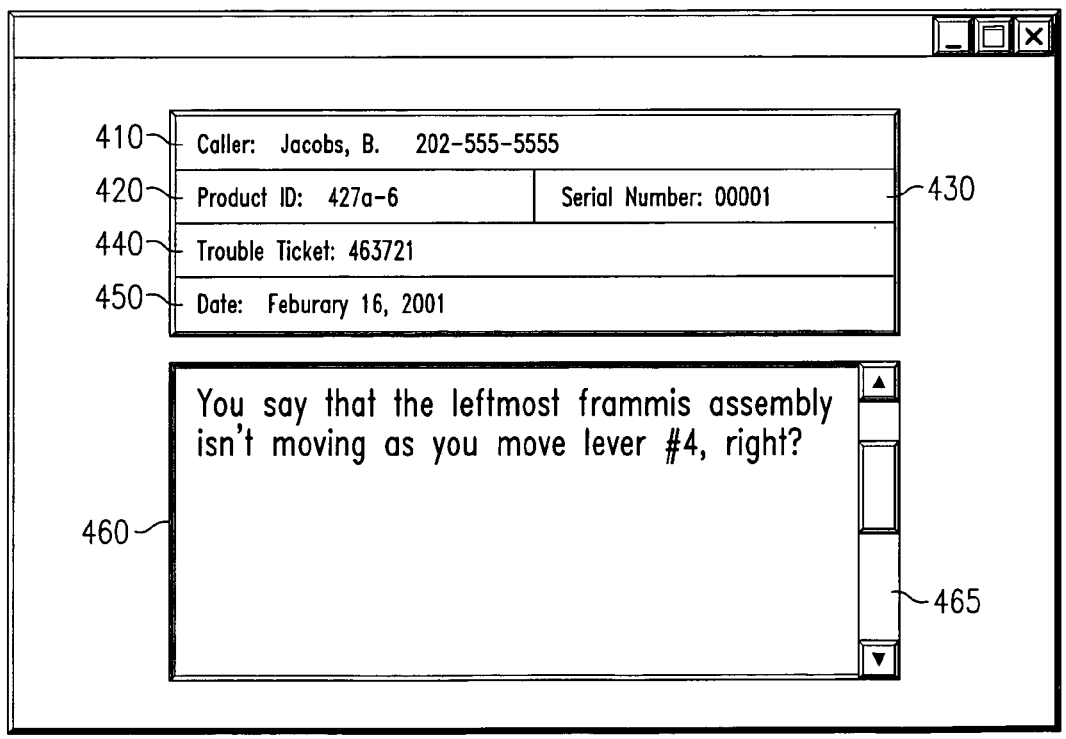

APPARATUS, SYSTEM AND METHOD FOR PROVIDING SPEECH RECOGNITION ASSIST IN CALL HANDOVER

BACKGROUND OF THE INVENTION

1. Technical Field

The present invention is directed to an improved data processing system. More specifically, the present invention is directed to an apparatus, system and method for providing speech recognition assist in call handover.

2. Description of Related Art

In support operations it is customary to organize the call center in terms of "levels of support." For example, level-1 support personnel are trained in basic diagnostic and remediation procedures only. Level-2 personnel are typically more specialized and are trained in a particular area of support. Calls are answered by level-1 personnel and if they determine that the assistance of level-2 personnel is required, they determine which specialization to hand the call over to, initiate a connection to the appropriate level-2 specialist, and inform the caller that they are being transferred to another support person. This organization allows many of the support calls to be handled by level-1 personnel who are typically paid less. This minimizes the overall cost of providing support without limiting the ability of the support center to handle difficult cases, requiring specialized training.

A caller who finds that the initial support personnel cannot handle their problem and is handed over to a level-2 support professional, often must repeat some or all of the information provided to the level-1 person. Basic identifying information, such as name, address, and product identification is often captured by the level-1 person using a computer-based software application, such as applications which store data provided by the operator by filling in a form. But often, the caller provides information relating to the reason for the call in an unstructured manner in response to questions posed by the call-taker, and this information is difficult to summarize and key into a computer system quickly.

More to the point, the call-taker may ultimately be able to resolve the caller's problem so that it will prove unnecessary to capture such information in a computer system. However, if the call is ultimately transferred to a level-2 specialist, this information may be of importance. Since most calls are handled by level-1 personnel, the default policy is not to take time to capture the caller-provided problem information. Rather, the level-1 personnel are forced to provide, if anything, a very concise summary of the caller's problem.

This is a source of potential error in that the level-1 personnel may not summarize the caller's problem appropriately or essential details may not be provided. Therefore, it would be beneficial to have an apparatus, system and method for capturing caller problem information to assist in call handover.

SUMMARY OF THE INVENTION

The present invention provides an apparatus, system and method for providing speech recognition assist in call handover. The apparatus, system and method provide a mechanism by which the capture of caller-provided information relating to the problem or reason for the call can be efficiently captured in a computer system so that it can be made available to level-2 specialists if necessary. This capturing of caller-provided problem information does not diminish the efficiency of the level-1 call taker since the mechanism of the present invention operates without requiring the level-1 call taker to learn new procedures. In fact, the mechanism of the present invention may increase the efficiency of the level-1 call taker since the level-1 call taker is no longer required to manually provide a brief summary of the caller's problem by keying the summary into a computer using a computer keyboard.

With the apparatus, system and method of the present invention, in a preferred embodiment, spoken utterances of the call taker, not the caller, are captured using speech recognition technology. This permits optimum use of speech recognition technology. The call taker can use a noise-canceling microphone placed optimally to receive voice input from the call taker. The speech recognition system can be trained to the specific speech patterns of the call taker and the vocabulary of the speech recognition system can be limited to the specific domain of discourse related to the job scope of the call taker.

With the mechanism of the present invention, the time a highly-trained and highly-paid specialist must spend with a caller who has been handed over to him/her is appreciably reduced. In addition, the caller experience is improved since the caller is not required to repeat information provided to the lower level call takers. Moreover, the present invention provides for capturing of problem information in a computer-accessible form so that the information may be analyzed at a later time in order to optimize the training and procedures of the level-1 and level-2 call takers. Other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is an exemplary block diagram of a speech recognition system in accordance with the present invention;

FIG. 4 is an exemplary diagram of a call-taker workstation interface in accordance with the present invention.

DETAILED DESCRIPTION OF THE PREFERRED EMBODIMENT

Figure 1:
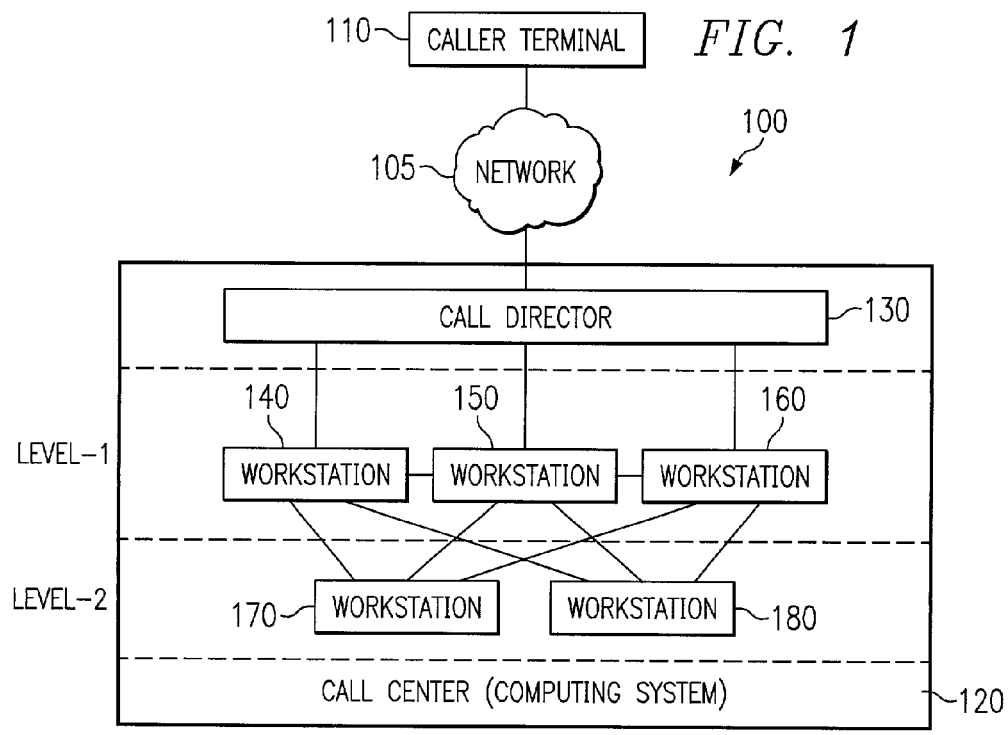
FIG. 1 is an exemplary block diagram of a distributed network in accordance with a known system for providing call support.

FIG. 1 is an exemplary block diagram of a distributed network of a known call support system. As shown in FIG. 1, the distributed network 100 includes a communication network 105, a caller terminal 110, and a call center 120. The caller terminal 110 may be any type of mechanism capable of sending and receiving communication signals by way of a wired or wireless communication connection with the communication network 105. The caller terminal 110 may be, for example, a conventional land-line telephone, a cellular telephone, an Internet based telephone device, a computer having a microphone or other audio input device, and the like. In a preferred embodiment, the caller terminal 110 is a conventional telephone of either the wired or wireless type.

The communication network 105 may be any type of network that provides communication pathways between caller terminals 110 and call center 120. The communication network 105 may be, for example, a conventional telephone network, cellular telephone network, data network, satellite network, or the like. Moreover, the communication network 105 may be any combination of one or more of these types of networks. In a preferred embodiment, the communication network 105 is a conventional telephone network in which switches, routers, and the like, are used to route communication signals from a source terminal to a destination device or terminal. The routing of signals through a conventional telephone network is well known and thus, will not be further explained herein.

The call center 120 includes a call director 130 and a plurality of call taker workstations 140-180. The call center 120 may further include computing devices and data storage (not shown) for controlling the operation of the call center 120 and storing data relevant to the operation of the call center 120.

The call director 130 typically receives calls from caller terminals, such as caller terminal 110, and determines to which call taker workstation 140-180 the call should be routed. Such routing of calls to call taker workstations 140-180 may be based on a workload management algorithm, a type of call being received, i.e. a call for technical assistance, a call for billing questions, etc., a type of caller placing the call, i.e. a good customer may be provided level-2 support rather than level-1 support, and the like. Any mechanism for determining which call taker workstation 140-180 is to handle the call is intended to be within the spirit and scope of the present invention.

For purposes of illustration, it will be assumed that a basic workload algorithm is used in which a call taker workstation that is not currently handling a call will be assigned to handle a currently pending call from a caller terminal. Thus, a first available call taker workstation will be assigned the task of handling the next call in a call queue of the call director 130. In addition, while the present invention will be described in terms of tiers of support, e.g., level-1 and level-2 support, the present invention is not limited to such. Rather, these designations are only provided for illustration in order to differentiate between two human operator workstations rather than to imply any particular limitations of the present invention.

With the present invention, a caller initiates a call to call center 120. The call may be initiated, for example, by a caller entering an address of the call center 120 via the caller terminal 110, for example. As an example, the caller may initiate the call by dialing a telephone number associated with the call center 120. The call director 130 of the call center 120 receives the call from the caller terminal 110 and places the call in a queue awaiting the first free level-1 call taker workstation 140-160. When one of the level-1 call taker workstations 140-160 becomes free, i.e. is no longer involved in handling a call, the next call in the queue is forwarded to the free level-1 call taker workstation, e.g., workstation 140.

The call taker workstation 140 answers the call. The call taker workstation 140 may be coupled to a caller id device (not shown) that is capable of obtaining information about the caller based on the caller terminal address. For example, the call signals provided by caller terminal 110 may include a telephone number of the caller terminal 110. The caller id device may receive this telephone number of the caller terminal 110 and search a database that provides the caller name, address, telephone number, and any other pertinent information.

In the prior art, as shown in FIG. 1, the call from caller terminal 110 is first handled by one of the level-1 call taker workstations 140-160. During this process, the caller may provide various information regarding the problem or reason of the call to the operator of the level-1 call taker workstation 140-160.

After interacting with the operator of the level-1 call taker workstation 140, for example, the operator of the level-1 call taker workstation may determine that the caller needs to be forwarded to a level-2 call taker workstation that is more specialized in handling the particular problem or concern of the caller. At such time, the operator of the level-1 call taker workstation 140 may place the caller on hold and then transfer the caller to a level-2 call taker workstation 170-180.

After deciding to transfer the call to a level-2 call taker workstation, the operator of the level-1 call taker workstation 140 may enter a summary into a record stored in a computer system associated with the call center 120. The summary is entered manually using, for example, a keyboard and pointing device, and is stored in a record associated with the call. In transferring the call from the level-1 call taker workstation 140 to a level-2 call taker workstation 170, for example, the operator of the level-1 call taker workstation 140 may also inform the operator of the level-2 call taker workstation 170 of the record reference number associated with the call so that the operator of the level-2 call taker workstation 170 may review the summary entered by the level-1 call taker workstation 140 operator and other information gathered by the caller id device. The level-2 call taker workstation 170 operator may then retrieve the record using the reference number and continue handling the call.

In the above system, the caller will typically be required to repeat information provided to the level-1 call taker workstation 140 operator when interacting with the level-2 call taker workstation 170 operator. This is because the summary provided by the level-1 call taker workstation 140 operator usually does not contain enough information and details regarding the call to provide sufficient basis for the level-2 call taker workstation 170 operator to provide assistance. Thus, after having explained their problem to the level-1 support personnel, the caller must again explain the problem to the level-2 support personnel. This can be quite frustrating to the caller as well as costly if the call is not a toll free call. Such repetition extends the time required to handle a call, thereby reducing the number of calls that can be handled as well as increasing the cost of maintaining the call center 120.

Figure 2:
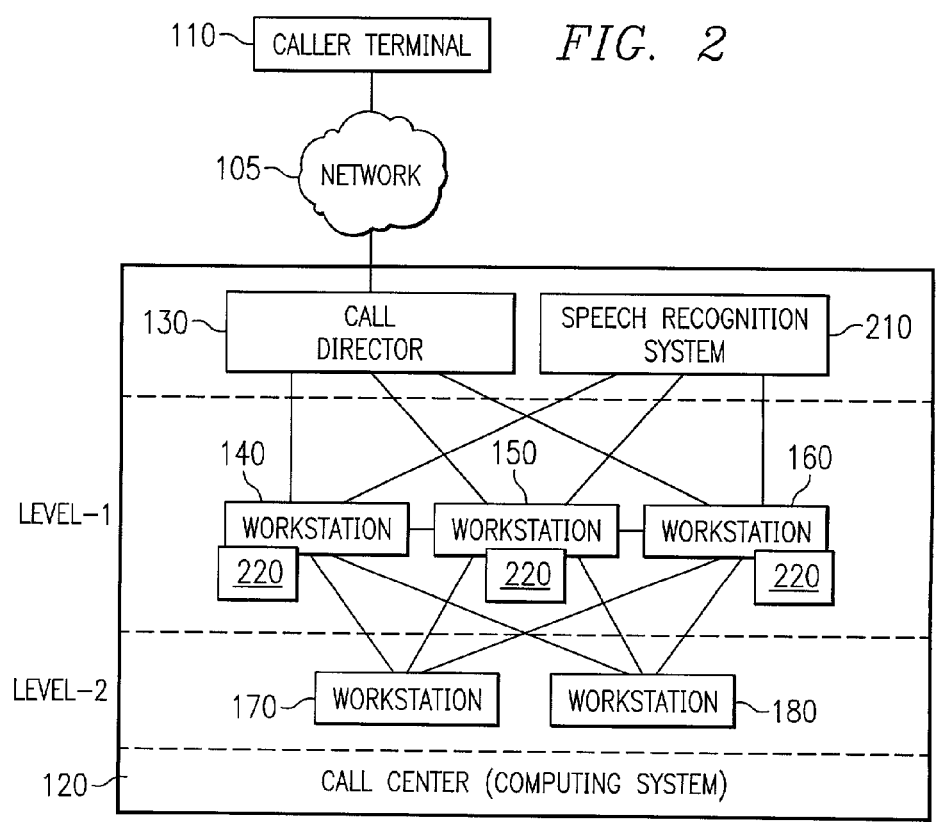
FIG. 2 is an exemplary block diagram of a distributed network in accordance with the present invention.

FIG. 2 is an exemplary block diagram of a distributed network in which the present invention may be implemented. Elements in FIG. 2 having similar reference numbers as elements in FIG. 1 are intended to refer to similar elements. As shown in FIG. 2, the distributed network system of the present invention augments the system shown in FIG. 1 by providing a speech recognition system 210 in the call center 120 that is coupled to the call director 130.

With the system shown in FIG. 2, the handling of a call from a caller terminal 110 by an operator of the level-1 call taker workstation 140 is the same as in the prior art system with regard to the viewpoint of the caller and the operator. However, the level-1 call taker workstation 140 in the system according to the present invention is equipped with a microphone 220. The microphone 220 is used by the present invention to provide speech input from the operator into the speech recognition system 210 while the operator is handling the call from the caller terminal 110. The microphone 220 may be a separate device coupled to the call taker workstation or may be a part of the standard telephone hardware used by the operator to conduct a conversation with a caller, e.g., the microphone in a handset of a telephone.

The capture of the operator speech may be triggered in any manner deemed appropriate to the particular application of the present invention. For example, capturing of the operator speech may be triggered automatically when the operator begins the handling of a call from the caller terminal 110. Such triggering may be, for example, voice activation of the speech capturing based on speech input received via the microphone 220. Alternatively, the capturing of speech may be triggered manually by the operator by, for example, pressing a button or key on the level-1 call taker workstation.

The speech recognition system 210 is preferably trained to recognize words spoken by the particular operator. Training of speech recognition systems is generally known in the art. For example, the IBM ViaVoice™ software, available from International Business Machines, provides speech recognition in which the software is trained to a particular user's speech patterns using a number of predefined training sessions. During these sessions, the user is asked to read various text passages so that the software can "learn" the manner by which the user speaks various words and phrases. The software may then interpret spoken words and transcribe them as text.

With the preferred embodiment of the present invention, the speech recognition system 210 is trained to recognize the speech of the level-1 call taker workstation operator rather than the caller. Because the speech recognition system 210 is trained for one individual operator rather than attempting to recognize speech from various callers, a more accurate representation of the actual speech may be obtained. If a general speech recognition system were used to try and recognize the speech of hundreds of callers, the likelihood that errors are introduced is quite high.

Moreover, the speech recognition system 210 may have a vocabulary of recognized words that is limited to specific terminology generally used in the context of the types of problems handled by the level-1 support personnel. For example, if the call center 120 is used to handle technical support problems for a video card product, the vocabulary of the speech recognition system 210 may be limited to terminology generally encountered when discussing problems associated with video cards. Thus, words such as "fluffy," "creepy," "sneeze" and the like may be eliminated from the vocabulary of recognized words. This helps shorten the period of time necessary to train the speech recognition system as well as eliminates possible sources of error.

Of course, while the preferred embodiment of the present invention provides speech recognition for the operator of the level-1 call taker workstation, the present invention is not limited to such an embodiment. Rather, the speech recognition system of the present invention may be used at any level of the call center or multiple levels of the call center. Thus, both level-1 and level-2 support personnel may make use of the speech recognition system of the present invention. Moreover, the speech recognition system may be used to recognize words spoken by the callers. However, as mentioned above, doing so may introduce errors into the descriptions of the problems experienced by the callers.

In the preferred embodiment, during handling of the call from the caller terminal 110, the capture of speech is activated. As mentioned above, this may be automatic or manual activation of speech capturing. For example, the operator may determine that the caller has verbally provided information relevant to the purpose of the call and may manually activate the speech capture.

The operator of the level-1 call taker workstation may then converse with the caller, preferably repeating or summarizing the problem information provided by the caller verbally. In repeating or summarizing the problem information, the operator speaks into the microphone 220. The operator's speech input is received by the microphone 220 which transmits the speech as signals to the speech recognition system 210. The speech recognition system 210 interprets the received signals as textual words and outputs the textual words to the call center computer system. The call center computer system may then store the textual words in a record associated with the call as well as provide the textual words as output to the level-1 call taker workstation for verification by the operator. The operator may be provided a mechanism through an interface associated with the level-1 call taker workstation to indicate whether or not to keep or discard the textual words.

In this way, if the call needs to be transferred to a level-2 specialist, the information stored by the speech recognition system 210 may be displayed to the specialist via his/her level-2 call taker workstation. The speech recognition system 210 or the computing devices of the call center may perform textual analysis of the recognized speech before displaying the information to the level-2 call taker workstation specialist in order to highlight or otherwise accentuate terms in the recognized speech. Similarly, the textual analysis may be used to abridge the recognized speech.

For example, assume that a caller initiates a call to the call center 120. The call director 130 routes the call to one of the level-1 call taker workstations 140. The caller then begins conversing with the operator of the level-1 call taker workstation 140 and describes the problem as: "I installed my video card according to the instructions but I keep getting a blue-screen error with the error code 06:0001:0054 when I try to run an application." The operator may then repeat the problem statement by saying: "So, what you are saying is that you installed your video card and your computer boots properly but when you try to run an application, you get a blue-screen error code 06:0001:0054."

This repetition of the problem statement is stated into the microphone 220 which picks up the voice input and converts it into electrical signals. These electrical signals are then transmitted to the speech recognition system 210 which translates the signals into recognized words based on pattern matching, which is generally known in the art. The resulting recognized speech is then stored in a record associated with the call and may also be output to the call taker workstation for verification.

When transferring the call to another call taker workstation, the operator may transfer the record of the call as well. This may include pressing a series of keystrokes on the call taker workstation to transfer the call and the call record to a particular other call taker workstation.

Prior to or during the transfer of the call record, the recognized speech may be analyzed to determine which words in the recognized speech are of importance to the particular other call taker workstation to which it is being transferred. Such a determination may be made based on stored information in the call center 120 identifying the specialty of each of the call taker workstations and/or a vocabulary of important words associated with that workstation. That is, the recognized words stored in the call record may be compared to a vocabulary associated with the call taker workstation to which the call record is being forwarded and any words appearing in both will be highlighted. Of course other mechanisms for displaying the important words in the transcription in a conspicuous manner may be used without departing from the spirit and scope of the present invention. For example, the words of importance may be displayed using a different color text, using a different size font, using a different font, and the like.

For example, after analysis the above recognized text may be displayed on the level-2 call taker workstation with highlighted text as: "So, what you are saying is that you installed your video card and your computer boots properly but when you try to run an application, you get a blue-screen error code 06:0001:0054. " In this way, the level-2 call taker workstation operator is informed of the problem being experienced by the caller in a manner so as to expedite handling of the call.

FIG. 3 is an exemplary block diagram of the speech recognition system according to the present invention. As shown in FIG. 3, the speech recognition system 300 includes a controller 310, a workstation interface 320, a speech pattern storage device 330, a recognized speech analysis device 340, a control program memory 350, and a call center interface 360. These elements 310-360 are coupled to one another via the control/data signal bus 370. Although a bus architecture is shown in FIG. 3, the present invention is not limited to such. Any mechanism may be used that facilitates the exchange of control and data signals between the elements 310-360 without departing from the spirit and scope of the present invention.

The controller 310 controls the overall operation of the speech recognition system 300 and orchestrates the operation of the other elements 320-360. The controller 310 receives speech input from the microphone associated with the call taker workstation via the workstation interface 320. The controller 310 then performs speech recognition operations on the received speech input based on control programs stored in the control program memory 350 and speech pattern data stored in the speech pattern storage device 330. The resultant recognized speech may then be stored in a record associated with the call in a storage device of the call center 120 via the call center interface 360.

The speech recognition system 300 further includes a recognized speech analysis device 340 which may be used to analyze the recognized speech information to identify important words in the recognized speech. This may include, for example, comparing the words in the recognized speech information to words stored in a vocabulary of important terms. Based on this comparison, a tag may be stored in association with the words in the recognized speech information indicating that the word should be highlighted or accentuated when the recognized speech information is output to a call taker workstation. As mentioned above, this recognized speech analysis device 340 may be present in the speech recognition system 300 or may be part of the call center 120 computing devices, for example.

It has been stated above that the recognized speech may be stored in a record associated with the call. As mentioned above with regard to FIG. 1, a computer record may be established for a call when a call is received by the call center. This record will have an identifying reference number or tag that allows the record to be retrieved. This reference number or tag may be used to associate the recognized speech with the particular call and store the recognized speech in association with the call record. When the record is to be transferred to another call taker workstation, the record reference number or tag may be forwarded to the call taker workstation which may then retrieve the record and display it accordingly.

FIG. 4 is an exemplary diagram of a call taker workstation interface in accordance with the present invention. As shown in FIG. 4, the operator of the call taker workstation is interacting with a caller. In FIG. 4, the field 410 is a visual display of the caller's name and address, e.g., a telephone number, as captured from the network, via a caller-id feature for example. Fields 420 and 430 display product identification data captured in verbal dialog between the caller and the operator and entered by either the operator, an automated touch-tone response system, an HTML form, or the like, or using the speech recognition mechanisms of the present invention.

Fields 440 and 450 contain information generated within the computer system of the call center to identify the record of the caller's call. These fields 440 and 450 include a ticket number, i.e. a record reference number, and a date/time at which the call was received.

Field 460 within the workstation interface displays the transcribed text as recognized by the speech recognition system of the present invention. This is a transcription of utterances by the operator of the call taker workstation in response to information received verbally from the caller via the network. The text field displays the transcription itself. Scroll bar 465 permits the operator to review selected portions of the transcription at will.

The call taker workstation interface shown in FIG. 4 represents the interface provided to both the level-1 and level-2 personnel (as well as any other support level personnel) either when first handling the call or when the call has been handed over to them. The call taker workstation interface permits very efficient transfer of calls to other personnel and minimum need to reacquire problem information from callers via verbal dialog. In this way, the call experience of the caller is quicker and more friendly, thereby reducing caller frustration.

Figure 5:
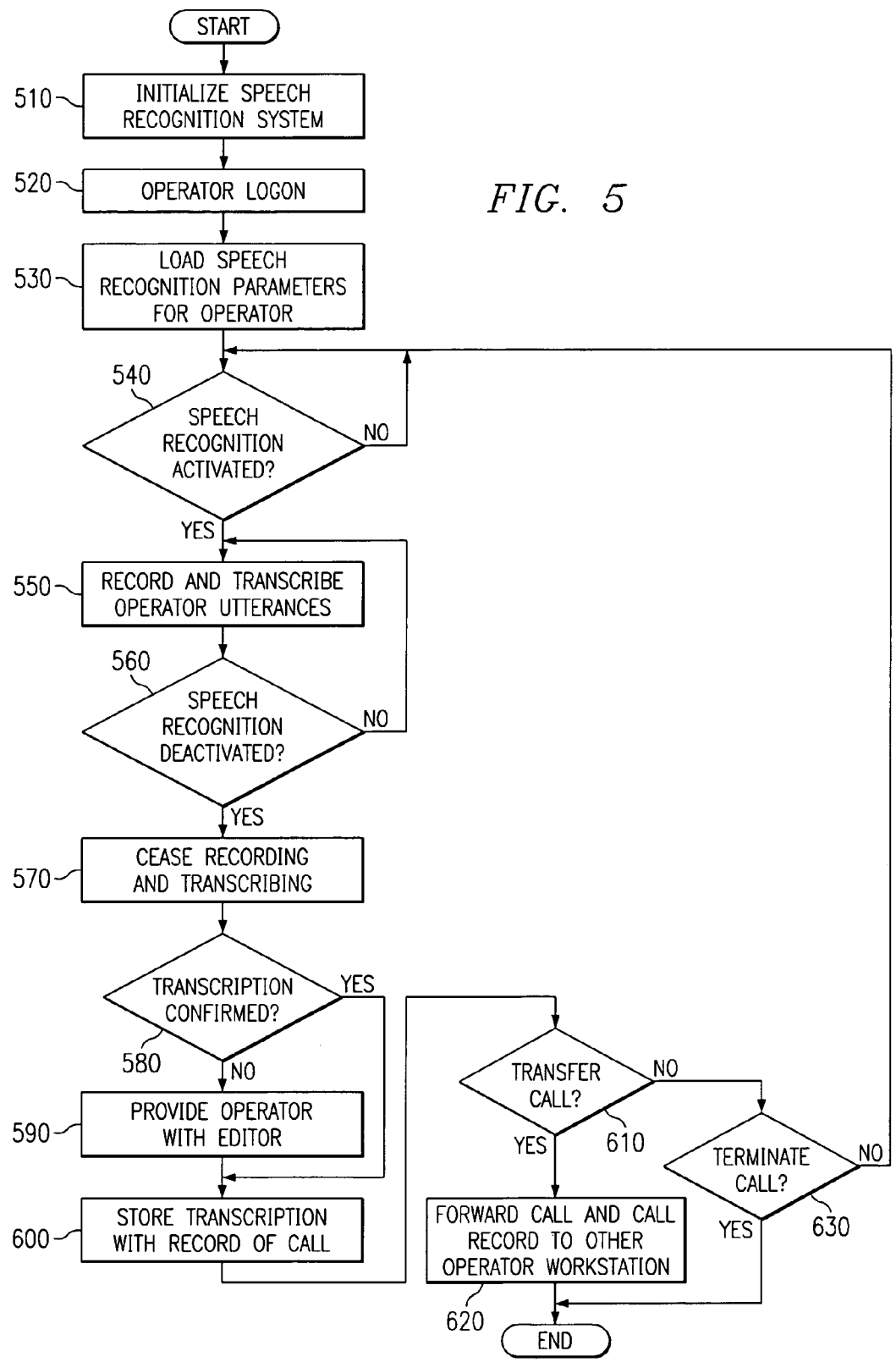
FIG. 5 is a flowchart outlining an exemplary operation of the present invention.

FIG. 5 is a flowchart outlining an exemplary operation of the present invention. As shown in FIG. 5, at system startup, the speech recognition system is initialized (step 510). This initialization includes commonly-needed functions such as the initialization of variables, the opening of a file for a transcription, and the like. The operator of the call taker workstation logs onto his/her workstation by inputting an appropriate operator identifier (step 520). Such log on can be done by typing in an appropriate operator identifier and password for example, by speaking into the workstation microphone and having voice identification software for identifying an operator based on voice input, or any other means by which the operator may identify himself/herself to the call center computing system. In one embodiment, the operator may utter a word or phrase and have the speech recognition system of the present invention attempt to correlate the voice input to stored voice pattern information for each of a plurality of operators to thereby identify the operator.

Once the operator is identified, the speech recognition system loads speech recognition parameters particular to the specific operator (step 530). This may include retrieving voice pattern information from a voice pattern storage device associated with the call center. The voice pattern information may be generated using the training mechanisms described previously.

Thereafter, a determination is made as to whether the speech recognition functions of the speech recognition system are activated (step 540). As mentioned above, the speech recognition functions may be activated manually by the operator or automatically upon receiving a call, for example. If the speech recognition functions are not activated, the operation returns to step 540 and continues to monitor for activation of the speech recognition functions.

If the speech recognition functions are activated in step 540, the workstation microphone is enabled and utterances by the operator are recorded and transcribed (step 550). The transcription continues until the speech recognition functions are deactivated by the operator or the call terminates (step 560).

Once the speech recognition functions are deactivated, recording and transcription ceases (step 570). The operator may then review the transcription and input an indication of confirmation of the transcription (step 580). If the transcription is not confirmed, the operator may be provided with an ability to edit the transcription or provide his/her own summary of the reason for the call (step 590). If the transcription is confirmed, the transcription is stored in a record associated with the call (step 600).

A determination is then made as to whether the call is to be transferred to another operator (step 610). If the call is to be transferred, the identifier for the operator workstation to which the call is to be transferred is received and the call and record reference number are forwarded to the operator workstation identified (step 620). If the call is not to be transferred, a determination is made as to whether the call is to be terminated (step 630). If the call is to be terminated, the operation ends. Otherwise, if the call is not to be terminated, the operation returns to step 540 and awaits further activation of the speech recognition functions of the present invention.

Although the above description has been provided in terms of the level-1 operator and level-2 operator are both part of the same support organization, the invention disclosed herein is not limited to such an organization. Rather, the present invention is applicable to all business models without limitation. In one business model, for example, a product manufacturer may employ an independent specialist support service to handle product support of certain kinds requiring specialist training. First level call handling may be provided by the manufacturer himself while call handover is from the manufacturer to the independent support specialist. In this model, the call center is shared by two firms, one which uses it for level-1 support and the other, the specialist support company, retrieves call records from the call center having transcribed information for use in providing level-2 support.

In an alternative business model in which the present invention may be employed, herein called a "call-broker" business model, the level-1 support is in an independent firm. This firm provides level-1 support and call handover to specialist support, which may be in an independent firm or may be a customer of the call-broker. For example, a product manufacturing firm may have several highly-trained individuals capable of providing level-2 support on a part-time basis. However, the product manufacturing firm may not wish to invest in a call center system such as that described above with regard to the present invention. A second firm, the call-broker, provides the level-1 support and the call center facilities of the present invention for a fee. The second firm need not invest in the expertise necessary to provide level-2 support and the manufacturing firm can concentrate on its core business which is the design, manufacture, and product specific support of its products.

Although the foregoing description has been written in terms of exemplary embodiments in which call handover is to a support specialist, the present invention is not limited to such. The selective transcription herein disclosed may be applied to any context in which call handover is used. For example, the speech recognition and transcription apparatus and functions of the present invention may be used when transferring calls from a message service to a firm employing the message service, and the like.

Thus, the present invention provides a mechanism by which verbal information relayed to a human operator may be automatically recorded and transcribed for use by a second operator to which the call is handed off. The present invention reduces the amount of time that the second operator must spend with the caller to ascertain the source of his/her problem or reason for the call as well as reduces the frustration level of the caller by eliminating repetition on the part of the caller. The present invention further limits possible sources of error in describing the problem or reason for the call by providing an automatic mechanism for obtaining a description of the problem or reason rather than relying on a summary generated by a human operator.

In addition to the embodiments described above, the present invention may be further equipped with a data mining system capable of mining the transcriptions generated by the present invention to identify advice or recommendations for handling the call. The mining of transcription data can be combined with systems capable of planning and giving advice, such as artificial intelligence systems including expert systems, neural networks, rule-based systems, and the like. Artificial intelligence systems are generally taught by Russell et al., Artificial Intelligence, A Modern Approach, Prentice Hall, Upper Saddle River, N.J., 1995, chapter 13 (ISBN 0-13-103805-2), which is hereby incorporated by reference.

With the present invention, the transcription generated by the speech recognition system identifies the problem or reason for the call. A data mining and advice giving system may access a knowledge base of past problems based on important terms identified in the transcription, identify a similar or related problem, and ascertain a most probable solution to the problem of the present call. The data mining and advice giving system may then inform the operator, via the call taker workstation interface, of the advice and/or recommended solution so that the operator may use this advice and/or recommended solution in handling the call.

The transcription of problem-specific data as illustrated in the descriptions above, facilitates a mode of business in which this problem-specific data is mined by an off-line process for marketing opportunities. As an example, consider the call taker workstation interface and example field entries shown in FIG. 4. These field entries may be used to hypothesize that the customer has an early model of the product. If a subsequent model has been redesigned so that the problem no longer occurs, a marketing opportunity to upgrade the customer to a newer model exists. In this mode of operation, a marketing specialist could be provided with the transcription and other customer data from call center computing system using a workstation similar to the call taker workstation. Rather than accepting the call, the marketing specialist would originate a call to the customer and discuss the marketing opportunity with him or her.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of handing over a communication from a first device to a second device, comprising:
    enabling a speech recognition function;
    using the speech recognition function to transcribe a portion of the communication to thereby generate a transcription, wherein the portion of the communication that is transcribed includes only speech input from a first call taker to the first device;
    analyzing the transcription to identify words of importance by comparing the transcription with a vocabulary associated with the second device, wherein the words of importance are words that appear in both the transcription and the vocabulary;
    displaying the transcription on the first device with the words of importance automatically and conspicuously identified in the display by one of highlighting, using a different color text, using a different size font, and using a different style font; and
    sending the transcription with the words of importance identified to the second device when handing over the communication from the first device to the second device.

2. The method of claim 1, wherein the portion of the communication that is transcribed includes speech input from a caller that initiated the communication.

3. The method of claim 1, wherein the first device is a first call taker workstation associated with a call center and the second device is a second call taker workstation of the call center.

4. The method of claim 3, wherein the first call taker associated with the first call taker workstation provides a first level of assistance and a second call taker associated with the second call taker workstation provides a second level of assistance.

5. The method of claim 4, wherein the second level of assistance is more specialized than the first level of assistance.

6. The method of claim 1, wherein the speech recognition function is trained based on speech input from the first call taker associated with the first device.

7. The method of claim 1, wherein the speech recognition function makes use of a reduced size vocabulary of recognized words that are specific to communications typically handled by the first device.

8. The method of claim 1, wherein the step of enabling the speech recognition function is performed automatically upon the occurrence of a triggering event.

9. The method of claim 8, wherein the triggering event is receipt of the communication at the first device.

10. The method of claim 1, wherein the step of enabling the speech recognition function is performed in response to a manual input from the first call taker associated with the first device.

11. The method of claim 1, further comprising:
    displaying the transcription on the second device after the transcription is received by the second device when handing over the communication from the first device to the second device.

12. The method of claim 1, wherein the first device and the second device are provided by a same entity.

13. The method of claim 1, wherein the first device and the second device are provided by different entities.

14. The method of claim 1, further comprising:
    analyzing the transcription to identify recommendations for handling the communication; and
    providing the recommendations to one of the first device and the second device.

15. The method of claim 14, wherein analyzing the transcription includes performing data mining on the transcription.

16. The method of claim 14, wherein analyzing the transcription to identify recommendations for handling the communication includes using at least one of an expert system, a neural network, and a rule-based system to identify the recommendations.

17. An apparatus for handing over a communication from a first device to a second device, comprising:
    a controller; and
    an interface coupled to the controller, wherein the controller enables a speech recognition function, uses the speech recognition function to transcribe a portion of the communication to thereby generate a transcription, wherein the portion of the communication that is transcribed includes only speech input from a first call taker to the first device, analyzes the transcription to identify words of importance by comparing the transcription with a vocabulary associated with the second device, wherein the words of importance are words that appear in both the transcription and the vocabulary, displays the transcription on the first device with the words of importance automatically and conspicuously identified in the display by one of highlighting, using a different color text, using a different size font, and using a different style font, and sends the transcription with the words of importance identified via the interface to the second device when handing over the communication from the first device to the second device.

18. The apparatus of claim 17, wherein the portion of the communication that is transcribed includes speech input from a caller that initiated the communication.

19. The apparatus of claim 17, wherein the first device is a first call taker workstation associated with a call center and the second device is a second call taker workstation of the call center.

20. The apparatus of claim 19, wherein the first call taker associated with the first call taker workstation provides a first level of assistance and a second call taker associated with the second call taker workstation provides a second level of assistance.

21. The apparatus of claim 20, wherein the second level of assistance is more specialized then the first level of assistance.

22. The apparatus of claim 17, wherein the speech recognition function is trained based on speech input from the first call taker associated with the first device.

23. The apparatus of claim 17, wherein the speech recognition function makes use of a reduced size vocabulary of recognized words that are specific to communications typically handled by the first device.

24. The apparatus of claim 17, wherein the controller enables the speech recognition function automatically upon the occurrence of a triggering event.

25. The apparatus of claim 24, wherein the triggering event is receipt of the communication at the first device.

26. The apparatus of claim 17, wherein the controller enables the speech recognition function in response to a manual input from the first call taker associated with the first device.

27. The apparatus of claim 17, wherein the first device and the second device are provided by a same entity.

28. The apparatus of claim 17, wherein the first device and the second device are provided by different entities.

29. The apparatus of claim 17, further comprising a transcription analysis device that analyzes the transcription to identify recommendations for handling the communication, wherein the transcription analysis device provides the recommendations to one of the first device and the second device.

30. The apparatus of claim 29, wherein the transcription analysis device analyzes the transcription using data mining on the transcription.

31. The apparatus of claim 29, wherein the transcription analysis device analyzes the transcription to identify recommendations for handling the communication using at least one of an expert system, a neural network, and a rule-based system to identify the recommendations.

32. A computer program product in a computer readable medium for handing over a communication from a first device to a second device, comprising:

first instructions for enabling a speech recognition function;

second instructions for using the speech recognition function to transcribe a portion of the communication to thereby generate a transcription, wherein the portion of the communication that is transcribed includes only speech input from a first call taker to the first device;

third instructions for analyzing to transcription to identify words of importance by comparing the transcription with a vocabulary associated with the second device, wherein the words of importance are words that appear in both the transcription and the vocabulary;

fourth instructions for displaying the transcription on the first device with the words of importance automatically and conspicuously identified in the display by one of highlighting, using a different color text, using a different size font, and using a different style font; and fifth instructions for sending the transcription with the words of importance identified to the second device when handing over the communication from the first device to the second device.

* * * * *